United States Patent [19]

Marsh et al.

[11] Patent Number: 4,502,953
[45] Date of Patent: Mar. 5, 1985

[54] WATER PURIFYING APPARATUS WITH AIR CHECK VALVE AND FILTER CONDITION INDICATION

[75] Inventors: Robert E. Marsh, Racine; Michael H. Colburn, Brookfield, both of Wis.

[73] Assignee: Plasworld, Inc., Racine, Wis.

[21] Appl. No.: 529,134

[22] Filed: Sep. 2, 1983

[51] Int. Cl.³ ............................................. C02B 1/82
[52] U.S. Cl. .................................... 210/94; 210/121; 210/257.2; 210/258
[58] Field of Search ............ 210/97, 104, 86, 94, 210/257.2, 258, 257.1, 416.3, 321.1, 121

[56] References Cited

U.S. PATENT DOCUMENTS

| | | | |
|---|---|---|---|
| 2,731,038 | 1/1956 | Purcell | 138/30 |
| 2,796,883 | 6/1957 | Thompson | 137/399 |
| 2,979,070 | 4/1961 | Payne | 137/192 |
| 3,031,891 | 4/1962 | Taylor | 137/399 X |
| 3,286,742 | 11/1966 | Doll | 222/95 X |
| 3,301,275 | 1/1967 | Brady | 137/399 X |
| 3,493,496 | 2/1970 | Bray et al. | 210/258 X |
| 3,505,216 | 4/1970 | Kryzer | 210/257.2 |
| 4,021,343 | 3/1977 | Tyler | 210/257.2 |

FOREIGN PATENT DOCUMENTS 1104527  2/1968  United Kingdom ............ 210/416.3

Primary Examiner—John Adee
Attorney, Agent, or Firm—Fowler, Lambert and Hackler

[57] ABSTRACT

Water purifying apparatus comprises a purified water storage vessel and a filter, preferably a reverse osmosis filter, for purifying water. An inlet side of the filter is adapted for connecting to a pressurized source of water to be treated and an outlet side of the filter is connected to an inlet of the storage vessel. A purified discharge line is also connected to the vessel inlet. The vessel is configured for being pressurized by a gas, such as air, in a manner that the pressurizing gas is in direct contact with purified water in the tank. A gas check valve is installed at the vessel combination inlet and outlet, the check valve comprising a spherical valve which floats in water and a valve seat against which the valve seals when most of the water has been withdrawn from the vessel, so as to prevent escape of pressurizing gas from the vessel. At least part of the check valve is made of transparent material so that verical floating movement of the valve can be observed as the vessel is filled from the filtering means, the rate of upward movement of the valve being indicative of filter condition.

4 Claims, 6 Drawing Figures

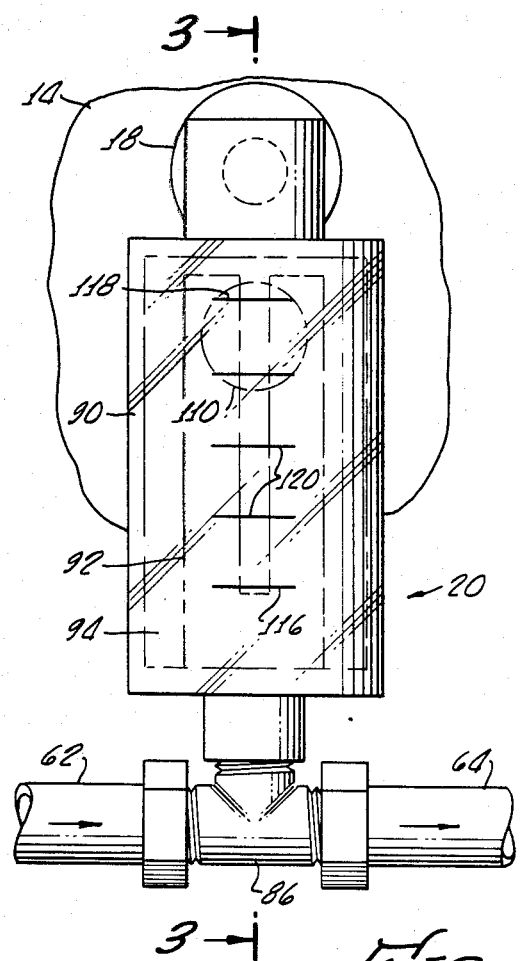
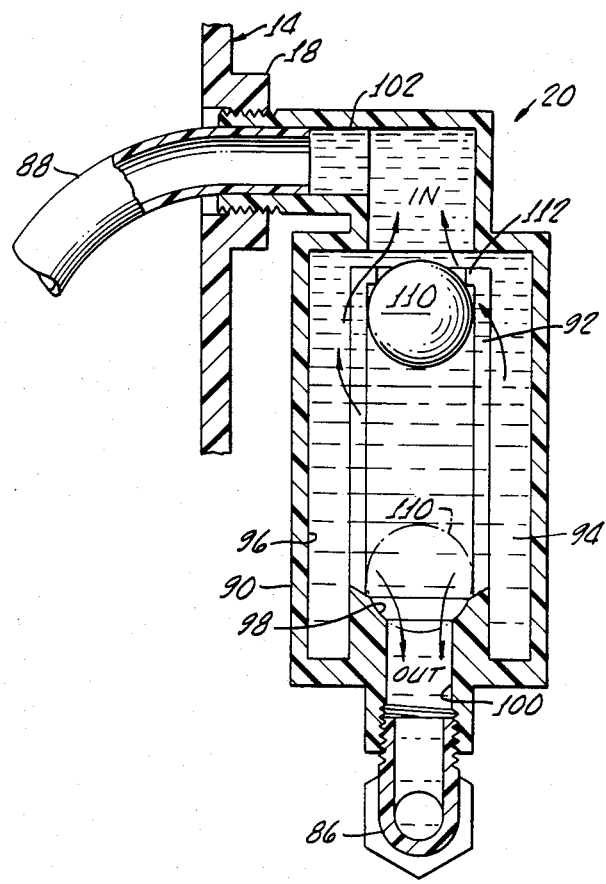
FIG. 2.
FIG. 3.
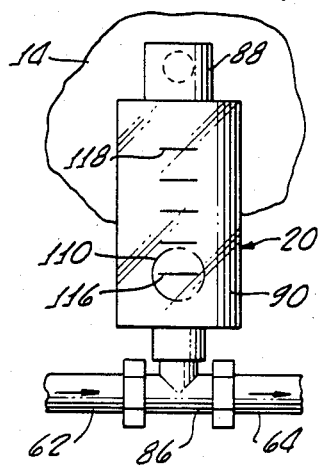
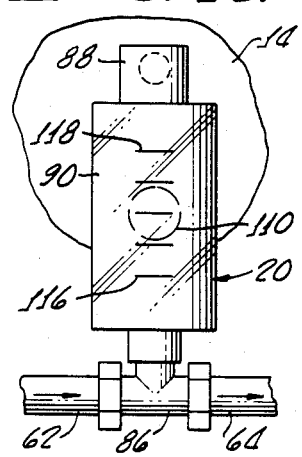
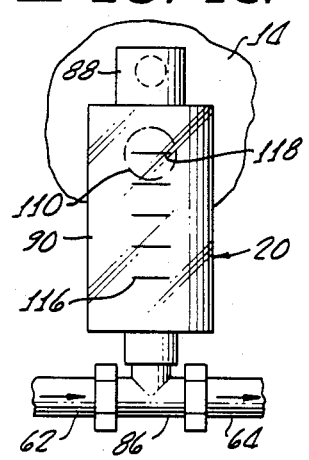
FIG. 4a.
FIG. 4b.
FIG. 4c.

WATER PURIFYING APPARATUS WITH AIR CHECK VALVE AND FILTER CONDITION INDICATION

BACKGROUND OF THE INVENTION

1. Field of the Invention

The present invention relates generally to water purification apparatus and more particularly to small-capacity water purification apparatus which are particularly adapted for home use.

2. Discussion of the Prior Art

Because of the poor quality of potable water in many parts of the world and the deteriorating quality of potable water in many other parts of the world, including the United States, small, highly efficient water purification systems suitable for home use are increasingly in demand. In this country the demand for such water purifying apparatus is fueled by public concern about the contamination of water supplies by industrial waste, agricultural pesticides and indiscriminate chemical dumping. Moreover, even in regions where the water is considered relatively safe to drink, the taste is often bad due to public water treatment additives, and home treatment to improve the taste is desirable.

Accordingly, various types of in-home, potable water treatment apparatus are on the market. Simple, relatively inexpensive apparatus, utilizing, for example, activated charcoal are available. These types of water filtering apparatus are typically installed directly in a water outlet line and may be connected to enable water flow selection either through or bypassing the filter. Usually, rather minimal improvement in water quality is achieved by such low cost filtering apparatus, although water clarity may be improved by the removal of suspended particulate matter. Ordinarily most bacteria and chemical contaminants are not removed by such simple apparatus.

True water purification apparatus, which remove bacteria and most chemical contaminants, usually use reverse osmosis filters of a micropore membrane type, and are more sophisticated, and hence, usually more expensive, than the above-mentioned, activated charcoal or similar types.

Typically, in reverse osmosis water purification systems, the filter element is connected, by a line tap, to a household water line, the line pressure forcing water through the filter. Because water flow rate is restricted through the filter, the purified water is usually discharged from the filter into a storage tank having a several gallon capacity. During water non-use periods, the storage tank is filled from the filter and during periods of water use, water is drawn from the tank.

Ordinarily water pressure is maintained in the storage tank by pressurized air so as to enable full utilization of purified water in the tank, since water line pressure would otherwise be attained in the tank only during periods of non-use when the tank was full. Unless pressurized, as soon as water withdrawal from the tank was started, water pressure at the point of use would rapidly diminish.

An automatic back pressure shut off may be provided to stop flow of untreated water through the reverse osmosis filter when the tank is filled. Filtered-out impurities are discharged from the filter, with some of the in-flowing water, to a household drain line.

Heretofore, to the applicants' knowledge, the storage tanks used in the described reverse osmosis water purification systems have used a plastic bladder or diaphragm to separate the pressurizing air from the purified water. This has been done so as to prevent escape of pressurizing air from the tank when, by use, the water level in the tank is reduced to a minimum level.

Use of such plastic bladders or diaphragms in the purified water storage tank has, however, caused various problems. Diaphragms are particularly difficult to seal in the tank and if the diaphragm or bladder leaks, pressurizing air escapes from the tank when the water level is reduced in the tank. Expensive repairs are then necessary. Furthermore, the plastic materials commonly used for the bladders or diaphragms are ordinarily a source of contaminants which tend to make the purified water taste bad. This is particularly the case when a bladder or diaphragm starts going bad or "sour". Accordingly, a secondary, flow-through filter, for example, using activated charcoal, is installed between the storage tank and the household tap to improve the taste of the water. Nevertheless, contaminants not removable by the secondary filter may be introduced into the purified water by the bladder or diaphragm and the effectiveness of the water purification system may accordingly be impaired.

Another disadvantage associated with heretofore known household-type water purification apparatus is the difficulty in determining when the main (reverse osmosis) filter should be replaced. It is known that the reverse osmosis filters used in household type water purification gradually lose their effectiveness, the rate of loss being dependent upon the quality of the water being purified and upon the amount of water processed by the filter, that is, by the amount of purified water used.

Inasmuch as the reverse-osmosis filters are not ordinarily visible to, or readily accessible by, the user, it has heretofore been very difficult to determine when the reverse osmosis filter should be replaced. Moreover, it has been difficult even to determine if the reverse osmosis filter of a water purification apparatus is properly operating upon the system's initial installation or after the system has been serviced. Typically, filter replacement intervals, which may be too short to be economical or too long for effective filter operation, according to water quality or usage, are specified. Alternatively, the reverse osmosis filters are replaced when the production rate of purified water becomes perceptibly slower than normal, which may be difficult to determine if the use rate is low, or when the quality of the purified water becomes noticably bad, which may, in some instances, occur only after the level of contaminants in the water has risen to unacceptable limits.

As a result, improvements to home-type water purification apparatus are needed, and it is an object of the present invention to provide water purification apparatus which eliminates the necessity for using a bladder or diaphragm in the storage tank and which enables easy determination by the user as to the filtering condition of the filter element and when the filter should be replaced.

Another object of the present invention is to provide a water purification apparatus for household use in which the pressurizing gas and purified water in the storage tank are in direct contact with one another and in which means are provided for preventing escape of pressurizing gas from the storage tank when the usable amount of purified water has been drawn from the tank.

A further object of the present invention is to provide a reverse osmosis-type water purifying system for household use in which the pressurizing gas and purified water in the storage tank are in direct contact with one another, and in which means are provided for enabling easy determination by a user as to the condition of the filtering element and when the filtering element should be replaced.

Other objects, features and advantages of the present invention will be readily apparent from the following detailed description when taken in conjunction with the accompanying drawings.

SUMMARY OF THE INVENTION

Water purification apparatus, according to the present invention, comprises a closed, purified water storage vessel having a purified water inlet and a purified water outlet and filtering means for removing impurities and contaminants from water, the filtering means having an unpurified water inlet and a purified water outlet. Preferably the filtering means comprise a reverse osmosis filter. The apparatus includes means for connecting the purified water outlet of the filtering means to the inlet of the vessel for delivery of purified water from the filtering means to the vessel, and for connecting the unpurified water inlet of the filtering means to a source of unfiltered water. Included in the apparatus are means enabling pressurization of the vessel to a preselected operating pressure and means connected to the outlet of the vessel for enabling the withdrawing of purified water therefrom without significant loss of pressure in the vessel. The apparatus further comprises means, responsive to the flow of purified water from the filtering means to the vessel, for determining the filtering condition of the filtering means.

The vessel pressurization means include means for introducing a pressurizing gas into the vessel and for causing the pressurizing gas to be in direct contact with purified water in the vessel. Means are connected to the outlet of the vessel for automatically sealing off the water withdrawing means when withdrawal of purified water from the vessel causes the level of purified water in the vessel to decrease to a preselected minimum level, so that pressurizing gas is retained in the vessel. The automatic sealing means include a valve chamber in fluid communication with the inside of the vessel. The chamber is formed having a valve seat and has disposed therein a float valve which has a specific gravity less than that of water but greater than that of the gas used to pressurize the vessel so that the valve floats at the surface of water in the chamber. The valve is configured for providing a water and gas-tight seal at the valve seat when the water level in the vessel decreases to the preselected minimum level.

Preferably the valve chamber comprises an elongate tube connected, in a vertical orientation, to the vessel at the outlet thereof, the tube having a transparent wall through which the float valve is visible. The filter condition determining means include the valve chamber and float valve and further comprise upper and lower valve position index marks defined on the tube in the region of the transparent wall. The marks are located so that the vertical position of the float valve is visible in relation to the index marks, the measured length of time required for the float valve to float upwardly from the lower index mark to the upper index mark during filling of the vessel with purified water from the filtering means providing an indication as to the filtering condition of the filtering means.

BRIEF DESCRIPTION OF THE DRAWINGS

A better understanding of the present invention may be had from a consideration of the following detailed description, taken in conjunction with the accompanying drawings in which:

FIG. 2 is a drawing of the combination pressurizing air check valve and filter condition indicating portion of the water purification apparatus of FIG. 1;

FIG. 3 is a transverse cross-sectional view taken along line 3—3 of FIG. 2, showing internal construction of the combination air check valve and filter condition indicating portion as mounted on a storage vessel of the apparatus; and FIG. 4 is a diagram showing the position of the air check valve relative to index marks on the valve chamber, FIG. 4(a) showing the position of the air check valve when water in the vessel has been reduced to a minimum level. FIG. 4(b) showing the position of the air check valve when the vessel is partially filled and FIG. 4(c) showing the position of the air check valve when the vessel has been filled to at least a predetermined level.

DESCRIPTION OF THE PREFERRED EMBODIMENT

Figure 1:
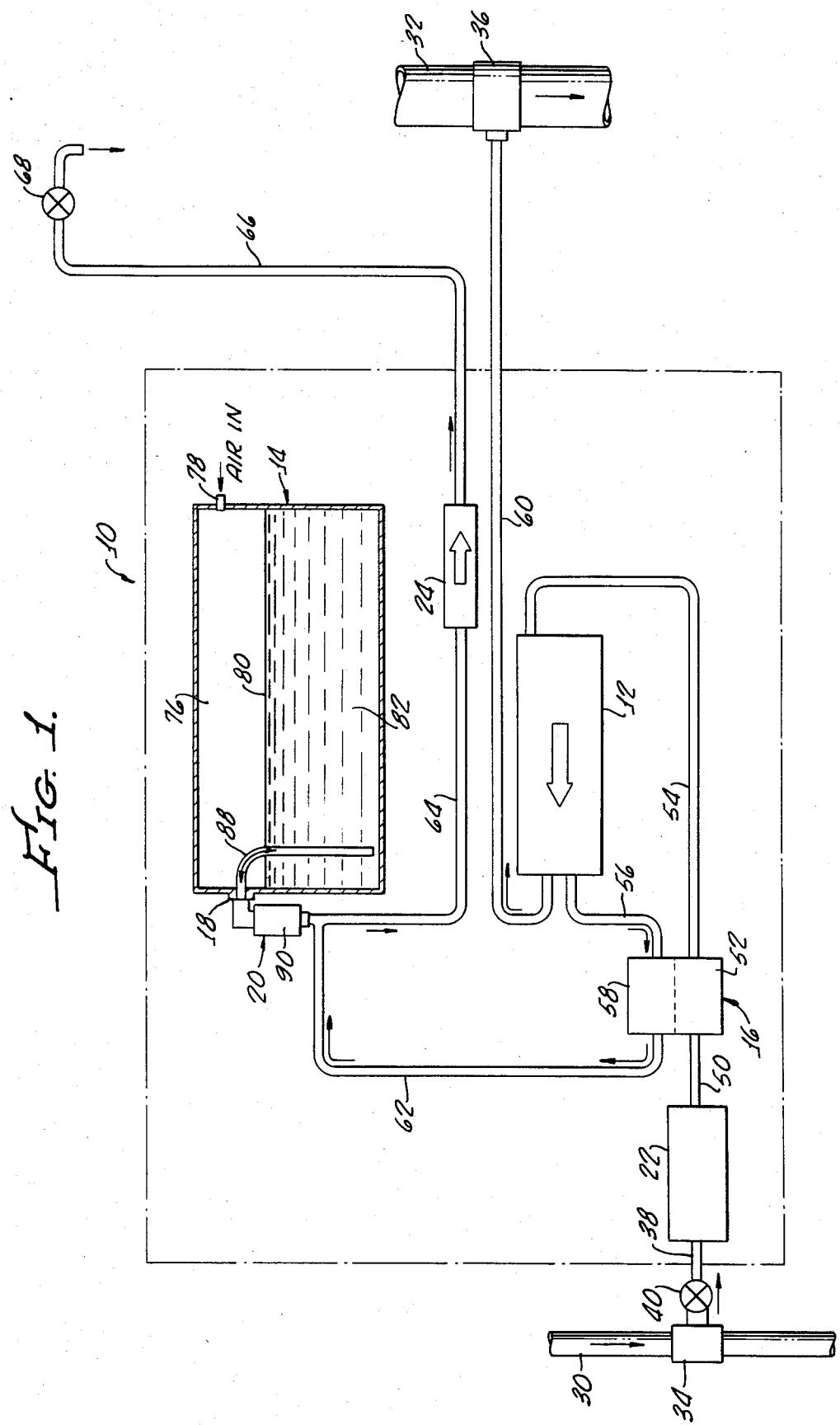
FIG. 1 is a pictorial diagram of a water purification apparatus according to the present invention.

A water purifying apparatus or system 10, according to the present invention, is depicted schematically in FIG. 1. Generally comprising purifying apparatus 10 are, as shown, a water purifying element or filter 12, a closed, purified water storage vessel 14 and a water flow control valve 16. Connected to vessel 14, at an inlet/outlet portion 18, are vessel pressurizing gas check valve and filter condition determining means 20. Apparatus 10 may additionally include a water pump 22 and a secondary filter 24.

Water purifying apparatus 10 is connected between conventional, ordinarily preexisting, water supply and water drain lines 30 and 32, respectively. Water supply line 30 may, for example, be a household cold water pipe. Connectors 34 and 36 are provided at lines 30 and 34, respectively, to enable installation of water purifying apparatus 10 between the lines.

More particularly, water purifying apparatus 10 is connected to water supply line coupling 34 by a water conduit 38. A manual shut off valve 40 is installed in conduit 38 adjacent coupling 34 (or is alternatively formed integrally with the coupling) to permit isolation of the water purifying apparatus from water line 30 for maintenance, servicing or repair purposes. If provided, pump 22 is connected in series with conduit 38 to boost the water supply pressure, as may be required for efficient operation of filter 12. An output of pump 22 is connected by conduit 54 to the inlet side of water purifying element 12. The term "untreated water" used herein applies to supply water which is as yet untreated by water purifying apparatus 10, although it should be appreciated that the supply water may have been previously treated to improve its quality or taste, for example, in a public or municipal water treatment facility.

Preferably for good water treatment, water purifying element or filter 12 comprises a conventional reverse osmosis filter which may employ a relatively large number of tubular, micro-pore membranes. As is known, in reverse osmosis the product water is driven under pressure away from the contaminated (untreated) water through water-selective membranes (water having a molecular diameter of only about 3 Angstrom units or about $3 \times 10^{-10}$ meters) constructed of such a material as cellulose acetate. The term reverse osmosis is derived from the fact that the osmotic pressure must be overcome in the process before any purified water is obtained. Since a pressure greater than the osmotic pressure must be applied to filter 12 before any purified water is obtained, augmentation of the water supply pressure, by use of pump 22, may be necessary.

From filter 12, purified water is fed, via a conduit 56, to a second portion 58 of flow valve 16. Many or most of the contaminants removed in the water purification process in filter 12 are carried out of the filter by a flow of untreated water, through a conduit 60 to drain line 32. Some of the contaminants, however, become entrapped in filter 12 and cause the efficiency or flow-through rate of the filter to diminish with time. Filter 12, or the elements (not shown) contained therein, therefore require periodic replacement, the useful life of filter 12 being dependent upon the amount and types of contaminants in the untreated water and the use rate.

Purified water is fed through valve portion 58 to air check valve and filter indicating means 20 via conduit 62. Such conduit 62 is teed into the bottom of means 20 with purified water outlet line 64, which is, in turn, connected to the inlet side of secondary filter 24 (if used). From secondary filter 24, purified water is fed through a conduit 66 to spigot or faucet 68. If secondary filter 24 is used, such filter may comprise a conventional filter of activated charcoal or similar acting material. And when used, the function of secondary filter 24 is principally to enhance the taste of purified water which may have been stored in vessel 14 for long periods of time.

As above-mentioned, water pressure in storage vessel 14 is maintained by a pressurized gas in a region 76 of the vessel over the purified water. A conventional gas filling valve 78 is installed in the vessel in gas region 76. In water purifying apparatus 10 according to the present invention, the pressurizing gas, at a pressure of about 10 psig, is in direct contact with a surface 80 of purified water 82 in vessel 14, no gas-water separating barrier, such as a bladder or diaphragm, being used. Ordinarily air is used at the pressurizing gas in vessel 14 since, at the pressures involved, air has been found not to be appreciably soluble in the purified water stored in vessel 14. Low solubility of the pressurizing gas in the purified water is important in providing a low-maintenance apparatus 10 which requires only very infrequent gas pressurizing of vessel 14.

Elimination of need for a separating barrier between the pressurized gas (air) and the purified water in vessel 14 is enabled by check valve and filter condition determining means 20. As best shown in FIG. 2, purified water conduits 62 and 64 tee into the bottom of means 20 at a tee fitting 86. A conduit 88 (FIGS. 1 and 3) connected at the top of means 20 extends into vessel 14 below water surface 80 to near the bottom of the vessel.

Means 20 comprise a generally tubular valve housing 90 (FIGS. 1-3) which is threaded into vessel portion 18 in a vertical orientation. Housing 90 is formed having means defining a vertically oriented float valve guideway 92 which extends over most of the height of the housing. Guideway 92 may, for example, be formed by a plurality of fins 94 which extend radially inwardly from an inner surface 96 of housing 90. A spherically curved valve seat or surface 98 is formed at the bottom of guideway 92. An aperture 100 formed through the bottom of housing 90 extends through valve seat 98. Tee 86 is threaded into the bottom of aperture 100. A passageway 102 at the top of housing 90 communicates with the top of guideway 92 and the inside of the housing. One end of water conduit 88 is threaded into the exterior end of passageway 102. Housing 90 is preferably constructed of a transparent plastic and is, of course, constructed sufficiently strong to safely withstand the expected pressures.

Further comprising means 20 is a spherical float or float valve 110 which, when installed in housing 90, is constrained to move vertically within guideway 92 (FIG. 3). The diameter of float valve 110 is the same as that of valve seat 98 so that when the float valve rests on the valve seat, a good seal is provided. Stops 112 are formed at the top of guideway 92 to confine float valve 110 in the guideway. Housing 90, including guideway 92, is formed so that the entire housing stays filled with purified water unless the water level in vessel 14 falls, through water use, to the lower end of water conduit 88.

Float valve 110 is constructed from a plastic material having a specific gravity less than that of water, that is, less than one, so that the float valve will float on the purified water as the last available amount of purified water is drawn from vessel 14. The specific gravity of float valve 110 is, of course, greater than that of the gas used to pressurize vessel 14. Ordinarily, more than the minimum level of purified water is in vessel 14 and float valve 110 floats as high as possible against stops 112 in guideway 92. In such highest valve position, purified water flows into and out of vessel 14, through housing 90 around float valve 110 (FIG. 3).

As, however, the last available water is drawn (through conduit 64 and spigot 68) from vessel 14, the water level in housing 90 drops rapidly and float valve 110 floats at the lowering surface of water until the valve rests on valve seat 98. As and when such valve seating occurs, gas (air) pressure in vessel 14 forces valve 110 into tight sealing against valve seat 98 so as to prevent the escape of any pressurizing gas from the vessel. Applicant has determined that the valve—valve seat sealing occurs instantaneously as the last available purified water is withdrawn from vessel 14 so that no detectable pressurizing gas loss past valve seat 98 occurs.

It is to be appreciated that as purified water is discharged through conduit 64 and spigot 68, the water is drawn from vessel 14 and/or from conduit 62 connected to filter 12. If water is discharged through conduit 64 at a rate which is less than the filter 12 output rate, water is drawn from conduit 62 and the excess of the filter production rate is fed into vessel 14, through housing 90, the water pressure pushing valve 110 off valve seat 98. If the discharge rate through conduit 64 is greater than the filter production rate, water is drawn from both vessel 14 and conduit 62.

When no water is being discharged from conduit 64, conduit 62 from filter 12 discharges into vessel 14, through means 20. Water from filter conduit 62 continues to discharge into vessel 14 until pressure in vessel 14 equalizes with line pressure upstream of filter 12. At this point, pressure valve 58 automatically shuts off the flow of untreated water into filter 12. Thus, during periods of purified water nonuse and when vessel 14 has been filled as completely as permitted by pressure in the vessel, there is no water flow into or through apparatus 10.

As filter 12 becomes more clogged with water contaminants and impurities, the through-put or production rate of the filter gradually diminishes and the effectiveness of the filter in removing contaminants also gradually diminishes. If the volumetric capacity of vessel 14 is sufficiently large that the vessel is seldom emptied by purified water usage, as is desirable from a user standpoint, diminution of the filter 12 purified water production rate is ordinarily not readily detectable until the condition of filter 12 has substantially passed the point at which the filter should be replaced.

Since heretofore known home-type water purification apparatus, which must be reasonably inexpensive to be practical for use by most home owners, have not, to applicants's knowledge, had provision whereby condition of the main, reverse osmosis filter (filter 12) can be readily determined by the user, a time schedule for filter replacement has often been prescribed. However, as above-mentioned, a periodic time schedule for filter replacement is usually meaningless, since the condition of the untreated water, and particularly the purified water use rate, may vary widely from one user to another. For some users, the filter replacement schedule may be too frequent, and hence, unnecessarily expensive. For other users, the time schedule may be too infrequent and may result in unsatisfactory operation of the purification apparatus.

Applicants have determined that condition of filter 12 is related to its rate of production of purified water—when the production rate is high, the filter is in good condition and when the production rate is low, the filter condition is poor. However, also as mentioned above, the production rate of filter 12 is usually not readily determined in most normal circumstances.

For the purpose of enabling the monitoring of the purified water production rate of filter 12, at least a face portion 114 of housing 90 is constructed of transparent material; although, the entire housing may be made of transparent material. Transparent face portion 114 is located so that float valve 110 can be seen therethrough when the valve is in sealing relationship with valve seat 98 and so the valve can be seen when it is at its uppermost position of travel at guideway stops 112. Two or more index marks are provided on housing transparent portion 114, so that a lower index mark 116 is aligned with valve 110 when the valve is at its lowermost position at valve seat 98 and an upper index mark 118 is aligned with the valve when the valve is at its uppermost position at stops 112. Additional index marks 120 may be provided intermediate lower and upper index marks 116 and 118.

As vessel 14 is filled with purified water from filter 12, upward movement of float valve 110 can be observed through housing transparent portion 114 by a user of apparatus 10, means 20 being connected to vessel 14 in a location where the housing can easily be seen after the apparatus is installed, although apparatus 10 may include a rigid protective cover (not shown) which has to be removed for a user to see means 10.

When purified water has been withdrawn from vessel 14 to the extent that float valve 110 seals against valve seat 98, the valve is aligned with lower index mark 116. With apparatus 10 then operated with discharge spigot 68 closed, purified water from filter 12 is fed into vessel 14 causing float valve 110 to float up in guideways 92 with the rising level of water in the vessel.

The length of time required for filter 12 to produce the amount of purified water required to move float valve 110 upwardly from alignment with lower index mark 116 (FIG. 1a) to alignment with upper index mark 118 (FIG. 4), while filling vessel 14 and without concurrent purified water use, has been determined to correlate closely with filter 12 condition.

As an example, it has been found that for a particular configuration of apparatus 10, when the vessel filling time associated with float valve 110 rising from lower index mark 116 to upper index mark 118 is about one minute, a normal purified water production rate of about five gallons per day is provided by the apparatus and filter 12 is in good condition. An appreciably faster transit time than one minute for such apparatus indicates a failure of filter 12, for example, a torn filtering membrane or seal failure, which would cause the produced water to be of poor quality. On the other hand, a filling time appreciably greater than one minute indicates that filter 12 is clogged and should be replaced. With each apparatus 10, appropriate instructions would describe how means 20 are used occasionally or periodically check the condition of filter 12.

Means 12 not only enable an owner-user to check the condition of filter 12 from time to time, but also enable installing and/or servicing personnel to determine whether or not apparatus 10 is operating properly, as is especially important when the apparatus is initially installed or after maintenance has been performed.

As above-described, means 10 also enable vessel 14 to be pressurized by air (or another gas) without requiring the use of gas-water separating means such as a diaphragm or bladder, thereby eliminating the many problems ordinarily associated with use of such separating means.

Although there has been described above a specific arrangement of a water purification apparatus in accordance with the present invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Water purification apparatus which comprises:
   (a) a pressure vessel for storing purified water, said vessel having a purified water inlet and a water discharging outlet;
   (b) filtering means for removing impurities from water, said filtering means having an unpurified water inlet and a purified water outlet;
   (c) means for connecting the purified water outlet of the filtering means to the inlet of said vessel for delivery of filtered water from the filtering means to the vessel, and for connecting the unpurified water inlet of the filtering means to a source of pressurized, unfiltered water;
   (b) means enabling pressurization of said vessel to a preselected operating pressure, said pressurization means causing a vessel pressurizing gas to be in direct contact with purified water in the vessel;
   (e) means connected to the outlet of said vessel for enabling withdrawing of purified water therefrom without substantial reduction of pressure in the vessel;

(f) means, responsive to the flowing of purified water from the filtering means to said vessel, for enabling the determination of the filtering condition of the filtering means; and (g) means connected to the outlet of the vessel for automatically sealing off the water withdrawing means when withdrawal of purified water from the vessel causes the level of purified water in the vessel to decrease to a preselected minimum level, the escape of pressurizing gas from the vessel through the water withdrawing means being thereby prevented, the automatic sealing means comprising a valve chamber in fluid communication with the inside of the vessel, said chamber being formed having a valve seat, and further comprising a float valve disposed in the valve chamber, the float valve having a specific gravity less than that of water but greater than that of the gas used to pressurize the vessel, the valve thereby floating at the surface of water in the chamber, the valve being configured for providing a water and gas-tight seal at the valve seat when the water level in the vessel decreases to said preselected minimum level.

2. The water purification apparatus as claimed in claim 1 wherein the valve chamber comprises an elongate tube connected to the vessel, at the outlet thereof, in a vertical orientation, the tube having a transparent wall through which the float valve is visible, and wherein the filter condition determining means include the valve chamber and float valve and further include upper and lower valve position index marks defined on the tube in the region of the transparent wall, said marks being defined so that the vertical position of the float valve is visible in relation to the index marks, the length of time required for the float valve to float upwardly from the lower index mark to the upper index mark during filling of the vessel with purified water from the filtering means being indicative of the filtering condition of the filtering means.

3. Water purification apparatus which comprises:
(a) a closed vessel for storing purified water, said vessel having a common purified water inlet and outlet;
(b) filtering means for removing impurities and contaminants from water, said filtering means having an untreated water inlet and a purified water outlet;
(c) means for connecting the unpurified water inlet of the filtering means to a source of pressurized, untreated water and the purified water outlet of the filtering means to the vessel common inlet and outlet;
(d) means enabling gas pressurizing of the vessel so that the pressurizing gas is in direct contact with purified water in the vessel; and
(e) means enabling the withdrawing of purified from the vessel without significant loss of said pressurizing gas, said withdrawing means being configured for enabling, in response to filling the vessel from the filtering means, determination of the condition of the filtering means; the withdrawing means comprising a gas check valve having a housing at least a portion of which is transparent, a valve seat in lower regions of the housing and a float valve disposed in the housing above the valve seat, movement of the float valve as the water level in the housing changes as purified water is fed into, or drawn out of, the vessel through the housing being visible, the rate of said movement being indicative of the condition of the filtering means.

4. The water purification apparatus as claimed in claim 3, including index marks formed on said housing along the path of said movement of the float valve so that position of the float valve can be accurately determined for measuring the rate of said movement.

* * * * *